Oct. 5, 1948.   J. H. MILLIGAN   2,450,840
DOOR LOCK
Filed Jan. 8, 1946   7 Sheets-Sheet 1
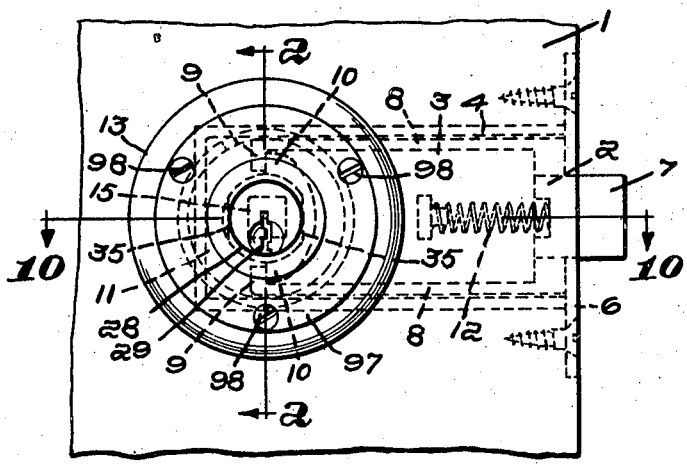
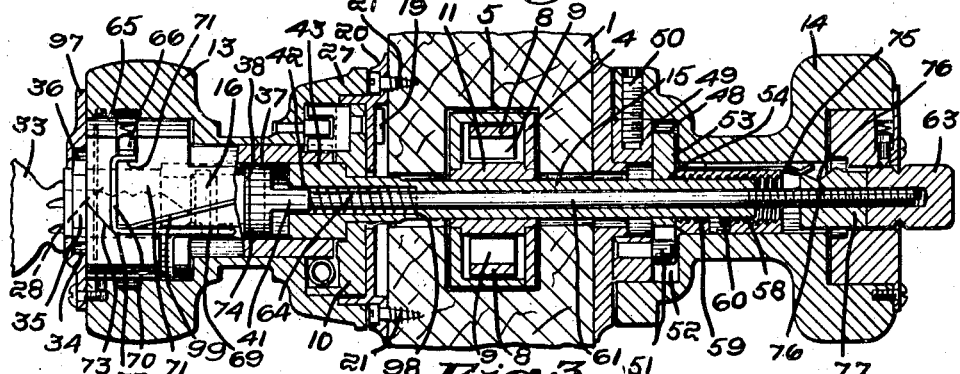
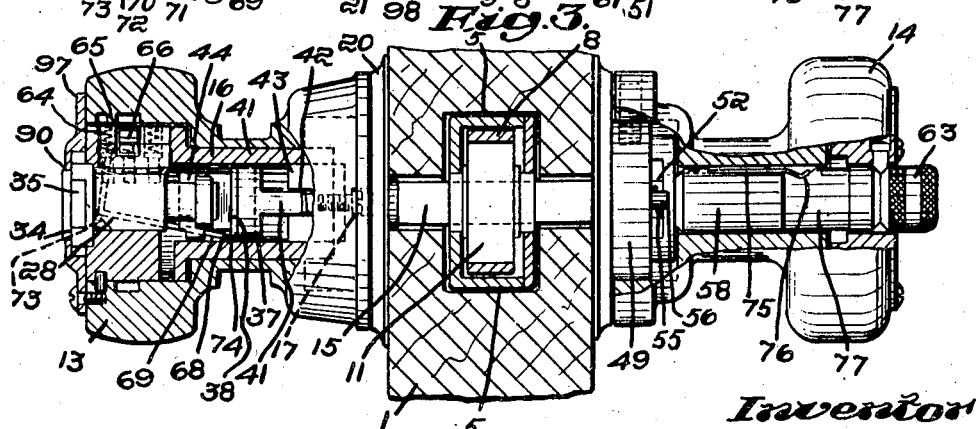
Inventor:
Joseph H. Milligan,
By Heard Smith Tennant
Attorneys Oct. 5, 1948. J. H. MILLIGAN 2,450,840
DOOR LOCK
Filed Jan. 8, 1946 7 Sheets-Sheet 2

Inventor:
Joseph H. Milligan,
by Heard Smith Tennant
Attorneys

Oct. 5, 1948.　　　　　J. H. MILLIGAN　　　　　2,450,840
DOOR LOCK
Filed Jan. 8, 1946　　　　　　　　　　　　　　7 Sheets-Sheet 3
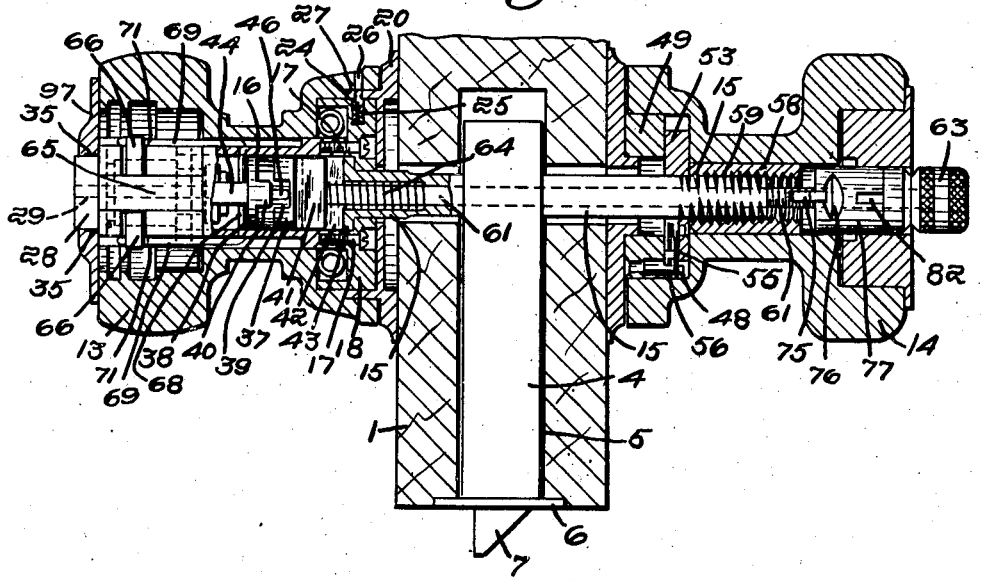
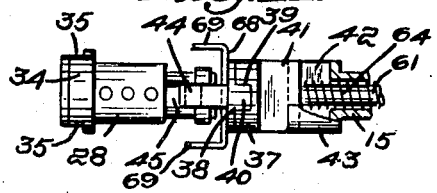
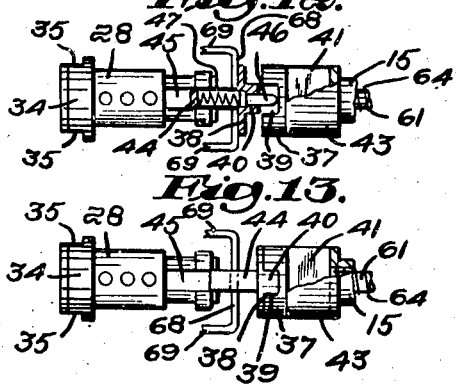
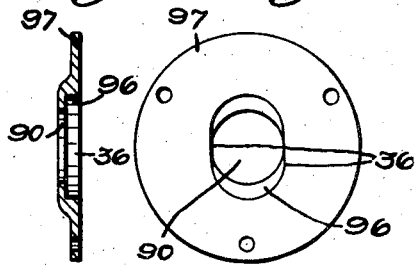
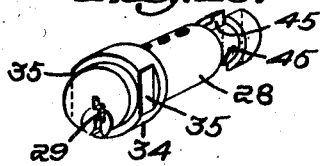
Inventor:
Joseph H. Milligan
by Heard Smith Tennant
Attorneys Oct. 5, 1948. J. H. MILLIGAN 2,450,840
DOOR LOCK
Filed Jan. 8, 1946 7 Sheets-Sheet 4
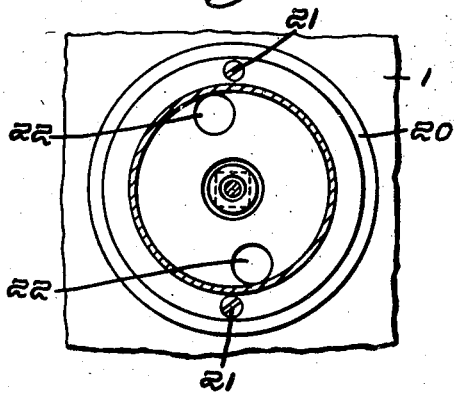
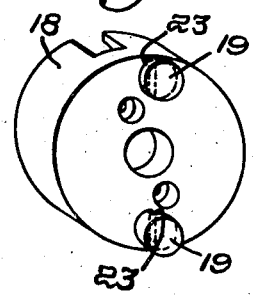
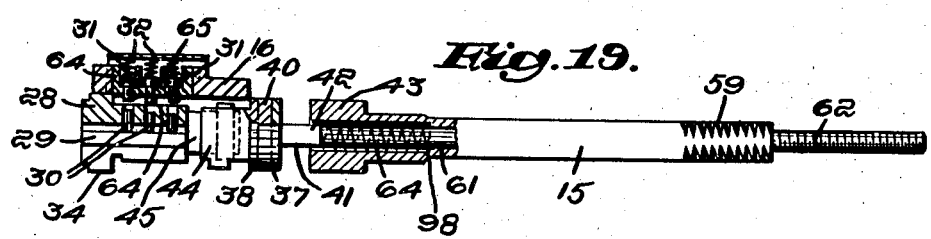
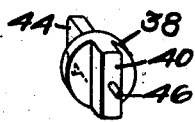
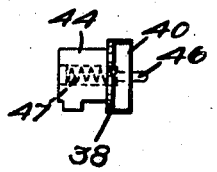
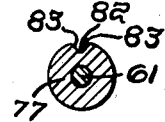
Inventor:
Joseph H. Milligan
by Heard Smith Tennant
Attorneys

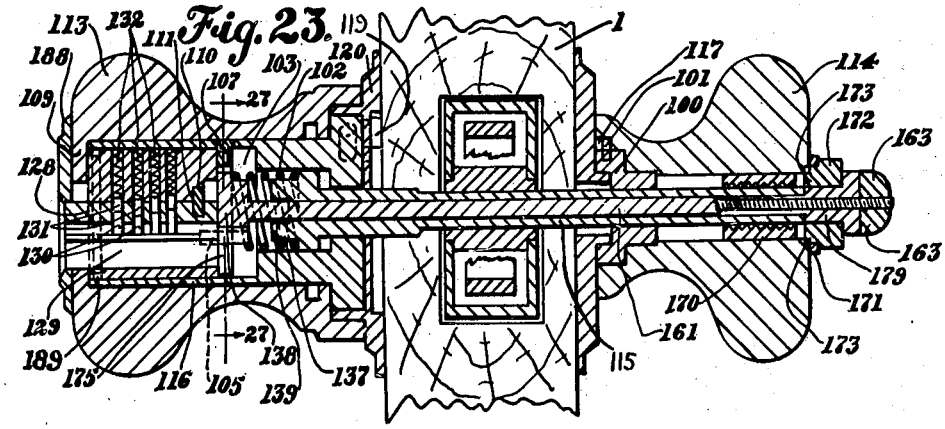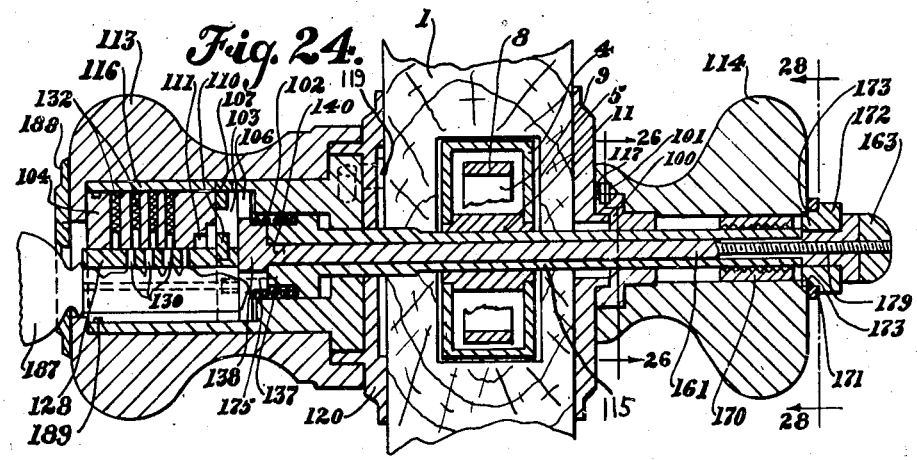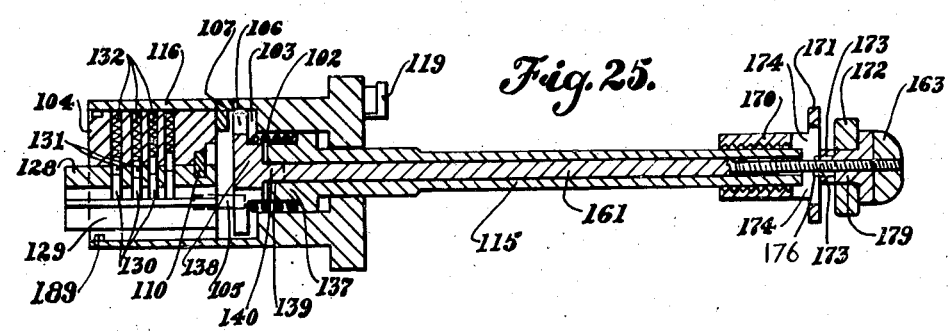

Oct. 5, 1948. J. H. MILLIGAN 2,450,840
DOOR LOCK
Filed Jan. 8, 1946 7 Sheets-Sheet 6

INVENTOR.
Joseph H. Milligan
BY Heard Smith Hennent
Attorneys

Oct. 5, 1948.  J. H. MILLIGAN  2,450,840
DOOR LOCK
Filed Jan. 8, 1946  7 Sheets-Sheet 7
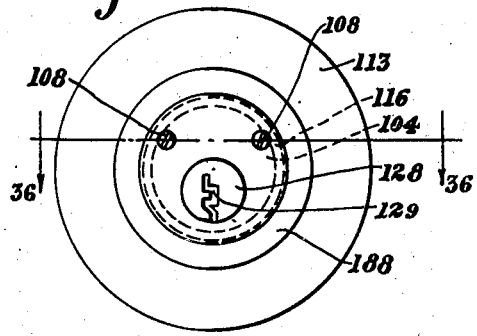
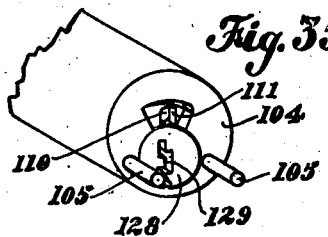
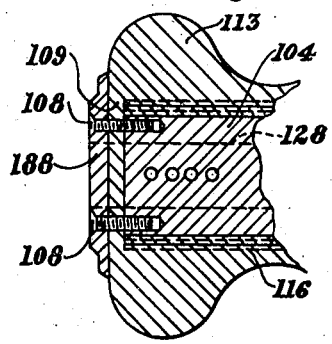
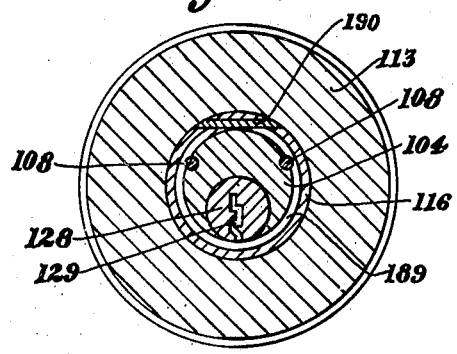
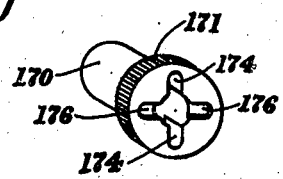
INVENTOR.
Joseph H. Milligan
BY
Heard Smith Tennant
attorneys.

Patented Oct. 5, 1948

2,450,840

UNITED STATES PATENT OFFICE 2,450,840

DOOR LOCK

Joseph H. Milligan, Framingham, Mass.

Application January 8, 1946, Serial No. 639,792

11 Claims. (Cl. 70—216)

1

This invention relates to door locks and especially to that type of door lock in which one of the door knobs, usually the outer door knob, has a lock mechanism incorporated therein and is normally locked from turning movement but can be unlocked by means of a key so that it can be turned to withdraw the door latch when the door is to be opened.

In doors having door knobs for opening the door, the two knobs are commonly mounted on a flat sided spindle which extends through the door and which carries a collar having arms that cooperate with fingers with which the door latch is provided, so that when either knob is turned the resultant turning movement of the spindle operates to withdraw the door latch.

It is one of the objects of my present invention to provide a novel door lock of the above-mentioned type which can be readily substituted for the ordinary pair of knobs and spindle of any door without making any alteration in the door itself, whereby a door which is provided with door knobs but not provided with a lock can be easily converted into a door having a door lock and which requires the use of a key for unlocking it.

Another object of the invention is to provide a door lock of this type in which the outer knob is normally locked from turning movement and is also normally disconnected from the spindle, and in which the insertion of a proper key in the key slot of the outer knob will not only unlock said outer knob so that it can be turned, but will also clutch the unlocked outer knob to the spindle so that turning movement of the outer knob will turn the spindle and thus withdraw the door latch.

A further object of the invention is to provide novel means whereby a person on the inside of the door can set the lock so that the outside knob will remain unlocked and will, at the same time, be coupled to the spindle, thereby making it possible for a person to open the door from the outside without the use of a key by simply turning the outside knob.

A further object of the invention is to provide a door lock of this type which is constructed so that a person on the inside of the door may set the lock so that the outside knob will remain unclutched from the spindle even after said outer knob has been unlocked by the insertion of a key, thereby making it impossible for a person on the outside of the door to open the latter even though he has the proper key.

A still further object of the invention is to provide a novel construction wherein when the lock

2 has been set to render the outside knob inoperative to open the door when said knob is unlocked by the usual key, the outside knob can still be rendered operative to open the door by using a special key for unlocking it.

Other objects of the invention are to provide various novel features relating to door locks of this type which will be more fully hereinafter set forth and then pointed out in said claims.

In the drawings:

Fig. 1 shows a portion of a door which is equipped with my improved lock, said figure showing the outside knob in end elevation.

Fig. 2 is a section on the line 2—2, Fig. 1 showing the position of the parts when the regular pass key has been inserted into the lock for unlocking the outer knob.

Fig. 3 is a similar section showing the lock set so that the outside knob can be turned to open the door without the use of a key.

Fig. 10 is a view similar to Fig. 2 but showing the position of parts when the door is locked and before the key is inserted.

Fig. 11 is a fragmentary view showing the position of the parts by which the outer knob is clutched to the spindle when the lock is set as shown in Fig. 3 so that the outer knob can be turned to open the door without the use of a key.

Fig. 12 is a view similar to Fig. 11 but showing the normal position of the clutch parts.

Fig. 13 is another view similar to Fig. 11 but illustrating the position of the clutch parts when the outer knob has been clutched to the spindle by the insertion of a key into the key slot.

Fig. 14 is a sectional view through the plate or disk secured to the outer knob by which it is coupled to the key plug.

Fig. 15 is an inside view of said plate or disk.

Fig. 16 is a perspective view of the key plug.

Fig. 17 is a section on the line 17—17, Fig. 4.

Fig. 18 is a perspective view of the attaching disk by which the knob-supporting member is secured to the door.

Fig. 19 is a fragmentary view showing the means by which the follower pins are raised when the lock is set from the inside of the door so as to permit the door to be opened by turning the outer knob and without the use of a key.

Fig. 20 is a perspective view of one of the clutch members by which the outer knob is clutched to the spindle.

Fig. 21 is a side view of said clutch member.

Fig. 22 is a fragmentary section through the sleeve 77.

Fig. 23 is a sectional view similar to Fig. 2 but showing a different embodiment of the invention.

Fig. 24 is a view similar to Fig. 23 but showing the position of the parts when a key has been inserted into the key plug of the outer knob and said knob has been clutched to the spindle.

Fig. 25 is a fragmentary view showing the position of the clutch parts when the lock has been so set from the inside of the door that the door may be opened by turning the outer knob without the use of a key.

Fig. 34 is an end view of the outer knob.

Fig. 35 is a fragmentary perspective view of the barrel seen from the inner end.

Fig. 36 is a fragmentary section on the line 36—36, Fig. 34.

Fig. 37 is a transverse section through Fig. 36.

Fig. 38 is a perspective view of the sleeve 170.

Figure 4:
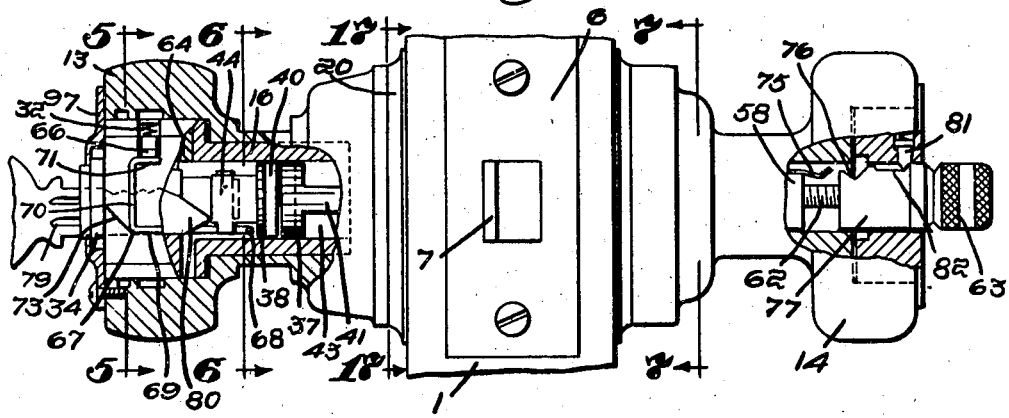
Fig. 4 is a partial sectional view illustrating the position of the parts when the lock has been set so that the outside knob can be unlocked and operated only by the use of a special key.
Figure 5:
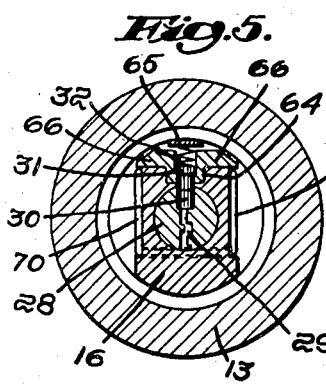
Fig. 5 is a section on the line 5—5, Fig. 4.
Figure 6:
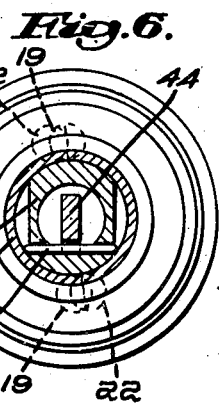
Fig. 6 is a section on the line 6—6, Fig. 4.
Figure 7:
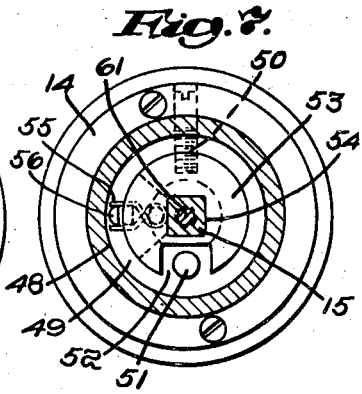
Fig. 7 is a section on the line 7—7, Fig. 4.

In the drawings 1 indicates a portion of a door which is equipped with the usual spring pressed door latch 2, the latter having a body portion 3 which is received in a housing 4 that is set into a recess 5 with which the door 1 is provided, the front plate 6 of the housing having an opening through which the nose 7 of the latch 2 projects. The body of the door latch is provided with two rearwardly extending arms 8 each having at its inner end an inturned finger 9, shown in dotted lines in Fig. 1, said fingers 9 co-operating with the arms 10 formed on a collar 11 that is journaled in the housing 9 and is provided with a square hole through which the square spindle of the knob assembly passes so that when either knob is turned, the turning movement of the collar will operate through one or the other of the arms 10 to move the latch 2 backwardly against the action of a spring 12 which normally holds the latch yieldingly in its projected position. This type of door latch is one which is quite commonly used.

As stated above, the present invention involves a pair of knobs having a door lock incorporated therein and a spindle associated therewith, which knobs and spindle can be easily substituted for an ordinary pair of knobs in any door having the door latch such as above described, thereby converting the door into one which can be locked and which requires the use of a key for unlocking it.

In the device herein illustrated, the outside knob of the improved knob assembly is indicated at 13 and the inside knob is indicated at 14. These two knobs are connected by a flat sided spindle 15 which extends through the door and through the square opening in the collar 11.

In both forms of the invention herein illustrated, the outer knob is normally locked against turning movement and is disconnected from the spindle while the inner knob is normally connected to the spindle so that the door can at all times be opened from the inside.

Furthermore, in both forms of the invention, the insertion of a key into the key slot of the outer knob results not only in unlocking the outer knob so that it can be turned, but also results in clutching, or coupling, the outer knob to the spindle so that turning movement of the unlocked outer knob will turn the spindle and thus withdraw the door latch.

In the construction shown in Figs. 1 to 22 the outside knob 13 is mounted for turning movement on a stationary knob supporting member 16 which is stationarily secured to the door 1. While the knob-supporting member may be rigidly attached to the door 1 in any suitable way, I have herein shown a construction which facilitates the mounting of said member on a door and also which provides for its ready removal therefrom.

Figure 8:
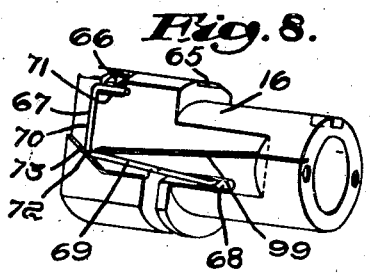
Fig. 8 is a perspective view of the knob-supporting member.
Figure 9:
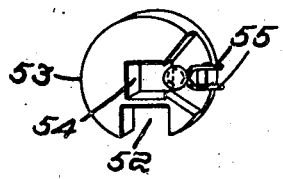
Fig. 9 is a perspective view of the means for yieldingly holding the inner knob in central position.
Figure 26:
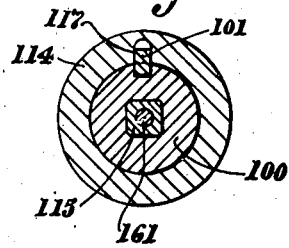
Fig. 26 is a section on the line 26—26, Fig. 23.
Figure 27:
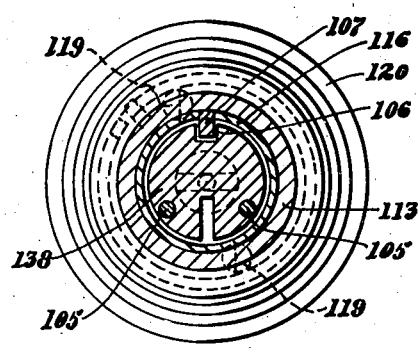
Fig. 27 is a section on the line 27—27, Fig. 23.
Figure 28:
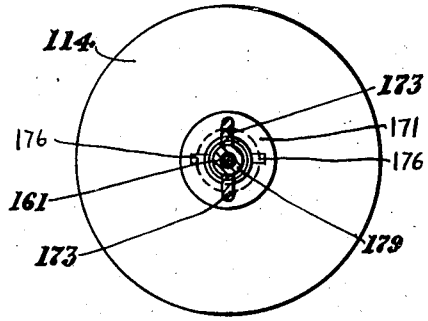
Fig. 28 is a section on the line 28—28, Fig. 24.
Figure 29:
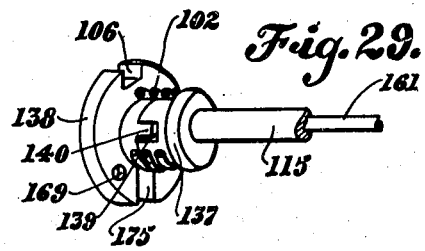
Fig. 29 is a perspective view of the clutch, by which the outer knob is clutched to the spindle, showing the two clutch members engaged.
Figure 31:
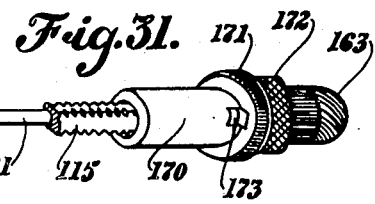
Fig. 31 is a fragmentary perspective view showing the knob 163 in its normal position illustrated in Figs. 23 and 24.
Figure 30:
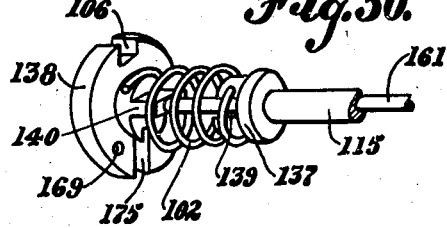
Fig. 30 is a view similar to Fig. 29 but showing the clutch members disengaged.
Figure 32:
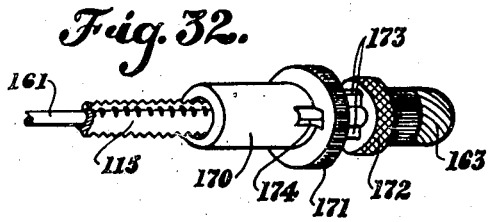
Fig. 32 is a view similar to Fig. 31 but showing the stem for the inner clutch pulled inwardly thereby so setting the lock that the door can be opened by turning the outer knob without the use of a key.
Figure 33:
Fig. 33 is a perspective view of the collar by which the parts are retained in the portion shown in Fig. 32.

The knob-supporting member 16, which is shown in perspective view in Fig. 8, is attached by means of screws 17 to an attaching disk 18 which is herein shown as provided on its inner face with two attaching studs 19. The door 1 has an anchoring plate 20 secured thereto by suitable screws 21 and this anchoring plate is provided with two openings 22 adapted to receive the studs 19. Each stud is cut away on one side to provide a notch 23 of a width corresponding to the thickness of that portion of the anchoring plate 20 in which the openings 22 are located.

To attach the knob-supporting member 16 with the outer knob 13 mounted thereon to the door, the anchoring disk 20 is first secured to the outside of the door by the screws 21 and then the studs 19 which project inwardly from the attaching disk 18 (it being understood that said attaching disk is secured to the inner end of the knob-supporting member 16 by means of screws 17) are inserted through the openings 22 in the anchoring plate and said knob and knob-supporting member are then turned slightly about their common axis to bring the edges of the openings 22 into the notches 23 thereby locking the knob-supporting member to the anchoring plate 20. The attaching plate 18 is provided with a radially arranged locking pin 24 which is backed by a spring 25 and which snaps into an opening 26 in the flange 27 of the anchoring disk 20 thereby locking the knob supporting member 16 and the anchoring disk 20 from relative turning movement. In this way, the knob-supporting member is rigidly and stationarily secured to the door.

The knob supporting member 16 is provided with a key plug 28 having a key slot 29 and said plug is normally locked to the stationary knob-supporting member by the usual tumbler pins 30 and follower pins 31, the latter being backed by usual springs 32.

When a properly cut key 33 is inserted into the key slot 29, the tumbler pins will be lined up as usual in locks of the Yale type thereby unlocking the plug from the stationary knob-supporting member 16 so that the plug can be turned.

The outside knob 13 is mounted on the knob-supporting member 16 for turning movement as stated above, but is so connected to the key plug 28 that said outside knob and key plug can have no relative turning movement but must always turn in unison.

One way in which this end is accomplished is by making the key plug with a circumferential rib 34 which has the two opposed flat sides 35 which engages the flat sides 36 of a recess 96 formed in a disk 97 that is secured to the end of the outside knob by screws 98, said disk having an opening 90 to receive the outer end of the key plug 28.

The key plug 28 is normally disconnected from the spindle 15 but can be connected or clutched thereto through the medium of a clutch device which is normally in open or unengaged position but which becomes engaged or operative by the insertion of a key 33 into the key slot 29, so that the operation of inserting the key and lining up the tumbler pins 30 thereby to unlock the knob 13, also renders the clutch device operative thereby clutching the plug to the spindle with the result that the turning of the outer knob 13 will turn the spindle and thus withdraw the door latch 2.

This clutch device comprises two clutch elements 37, 38. The inner clutch element 37 is coupled to the spindle 15 and is shown as having a diametrical slot 39 adapted to receive a diametrical rib 40 with which the outer clutch member 38 is provided. The inner clutch member 37 is provided with a fin 41 which is received in a slot 42 with which the head portion 43 of the spindle 15 is provided. The inner clutch member 37 is thus continuously coupled to the spindle for rotation therewith.

The outer clutch member 38 is also provided with a fin 44 which is received in a slot 45 with which the key plug 28 is provided at its inner end and thereby the outer clutch member is coupled to the key plug.

The outer clutch member 38 is provided with a centrally located pin 46 which is backed by a suitable spring 47 and which tends to hold the two clutch elements 37, 38 disconnected from each other as shown in Figs. 10 and 12.

The pass key 33 is so constructed that when it is inserted into the key slot to line up the tumbler pins, the end of the key will engage the fin 44 of the outer clutch member 38 just before the key has been fully entered into the key slot and before the tumbler pins 30 are properly lined up, so that during the final movement of the key into the slot, the tumbler pins become properly lined up and the outer clutch member is given an inward movement against the action of the spring 47 sufficient to enter the rib 40 on said outer clutch member into the slot 39 of the inner clutch member thereby coupling the two clutch members together.

When this condition is secured, the outer knob 13 is free to be turned on the knob-supporting member 16 because the tumbler pins have been lined up, and the key plug 28 is clutched or coupled to the spindle 15 so that the turning of the outer knob will turn the spindle and thereby withdraw the door latch 2.

When the key is withdrawn, the spring 47 functions to separate the two members of the clutch thus unclutching the outer knob from the spindle, and, of course, the follower pins automatically become operative to lock the knob 13 to the knob-supporting member 16.

I have provided means herein whereby the lock can be so set from the inside of the room that the spindle 15 will remain clutched to the key plug and the tumbler pins will remain lined up even after the key 33 has been removed, thereby making it possible to operate the outer knob 13 and open the door without the use of a key.

I have also provided herein means whereby the lock can be so set from the inside of the door that the clutch will remain disengaged even when the pass key 33 has been fully inserted into the key slot and the tumbler pins have been consequently lined up thereby making it impossible to operate the spindle 15 and open the door by turning the outer knob.

Before describing the means by which these ends are accomplished, I will refer to the construction of the inner knob 14.

The inner end of the inner knob 14 is provided with a recess 48 in which is received a collar 49 that is rigidly secured to the knob through the medium of a screw 50. The collar 49 is formed with a stud 51 which is received in a recess 52 formed in a coupling collar 53 that is provided with a square opening 54 through which the square spindle 15 extends.

The turning of the inner knob 14 will turn the collar 49 and through the co-operation of the pin 51 and the recess 52 this turning movement will be communicated to the coupling collar 53 and thereby to the spindle 15.

It will be remembered that normally the clutch 37, 38 by which the plug 28 is coupled to the spindle is held disengaged by the pin 46 and spring 47 as shown in Figs. 10 and 12 and the spindle 15 is therefore free to be turned by the inner knob at any time even though the outer knob is locked from turning movement. The recess 52 is wider than the diameter of the stud 51 so that there is a certain amount of play between the collars 49 and 53. The collar 53 is shown as having two spring arms 55 extending from the periphery thereof which embrace a stud 56 carried by the collar 49, these spring arms serving as a yielding centering device to normally hold the two collars in relative position with the stud 51 occupying the center of the recess 52.

The inner knob 14 is supported by a sleeve 58 which is rigid with the spindle 15. This sleeve 58 is adjustably mounted on the spindle for which purpose the outer end of the spindle is screw threaded as shown at 59, the screw threads being cut on the corners of the square spindle only. The sleeve 58 is interiorly screw threaded to fit the screw threads 59. Said sleeve is held in its adjusted position by a set screw 60 which is set against one of the flat sides of the spindle.

I have stated above that the present invention involves a construction by which the lock can be set from the inside knob so that the clutch 37, 38 remains engaged and the tumbler pins 30 remain lined up even after the key 33 has been removed, thus freeing the outer knob for turning movement and making it possible to open the door simply by turning the outer knob and without the use of a key. The construction by which this end is accomplished is as follows.

The inner clutch member 37 has a stem 61 extending therefrom which passes through an axial bore with which the spindle 15 is provided, the outer end of the stem 61 being screw threaded as shown at 62 and having a knob 63 screw threaded thereon, which knob extends through an axial opening in the inner knob 14 and projects beyond the inner face thereof. A spring 64 encircles the stem 61 and is confined between the fin 41 and a shoulder 98 formed in the spindle 15, said spring normally holding the clutch member 38 yieldingly in the position shown in Fig. 12. By pushing inwardly on the knob 63, the stem 61 and the connected clutch member 37 will be moved axially to the left a sufficient distance to bring the two clutch members 37, 38 into clutching engagement as shown in Figs. 3 and 11. This same movement operates also to line up the follower pins 31 by the following means: The follower pins 31 are shown as carried by a block 64 which is mounted in a slot with which the knob-supporting member 16 is provided and is capable of vertical movement therein. This block is retained in the slot by means of a retaining plate 65. The block is provided with two laterally extending arms 66. The knob-supporting member 16 is provided with a block-lifting element 67 herein shown as made from a piece of wire bent centrally to present the bridge portion 68 which extends from one side to the other of the knob-supporting member 16 through a transverse opening therethrough, and also bent to present the two arms 69 extending along opposite sides of the knob-supporting member. The outer ends of these arms are bent up as indicated at 70 and then bent backwardly as shown at 71, the backwardly bent portions 71 lying under the arms 66. The elbow portion 72 of each arm 69 lies on a cam face 73 formed on the side of the knob-supporting member. This block-lifting element 67 is normally in the position shown in Fig. 2 and is retained in such position by the spring arm 99, but when it is moved to the left into the position shown in Fig. 8, the elbow portions 72 ride up the inclined surfaces 73 thereby raising the end portions 71 of the arms. This rising movement of the end portions 71 operates through the arms 66 to raise the block 64 thus lifting the follower pins out of engagement with the plug 28 and unlocking the plug from the knob-supporting member as seen in Fig. 19.

The movement of the knob 63 inwardly into the position shown in Figs. 3 and 11 not only brings the two clutch members 37, 38 into clutching engagement but also moves the outer clutch member 38 further into the plug 28, during which movement the portion 74 of the outer clutch member engages the bridge portion 68 of the block lifting member and pushes said member to the left into the position shown in Fig. 8, thereby causing the elbow portions 72 to ride up the inclining faces 73 with the result that the block 64 carrying the follower pins is raised to lift the follower pins out of the plug 28.

When this condition obtains then the outer knob 13 is unlocked from the knob-supporting member and is also coupled to the spindle 15 so that the door latch can be withdrawn by simply turning the outer knob and without the use of a key.

The stem 61 is yieldingly retained in this position by means of a spring detent 75 carried by the sleeve 58 and which is adapted to snap into a recess 76 formed on a collar 77 carried by the stem 61 as shown in Fig. 3.

The lock may also be set from the inside of the door so that the two clutch members 37, 38 can not be clutched together by the insertion of the pass key 33 into the key slot, but only by the use of a special key.

This is accomplished by pulling the knob 63 outwardly from its central position into the position shown in Fig. 4 thereby separating the two clutch members 37, 38 to such an extent that the movement which is given to the outer clutch member 38 by the use of the pass key 33 is insufficient to bring the two clutch members into engagement. When the stem and the inner clutch member is in this position as shown in Fig. 4, the two clutch members 37, 38 can only be clutched together by using a special key 79 which has a longer point 80 than the regular pass key 33. When this long key is inserted into the key slot, it not only lines up the tumbler pins but the movement of the key in the slot necessary to line up the tumbler pins is sufficient to move the outer clutch 38 into clutching engagement with the inner clutch 37.

The stem 61 and knob 63 may be yieldingly held in the position shown in Fig. 4 in various ways. As herein shown, the outer knob is provided with a spring-pressed retaining pin 81 and the collar 77 is formed with a recess 82 into which the inner end of the pin 80 may snap when the stem is pulled outwardly into the position shown in Fig. 4, the engagement of the pin with the end wall of the recess serving to hold the stem in this position. The side walls 83 of the recess are beveled so that a turning movement of the inner knob 14 will serve to cam the spring-pressed pin 81 backwardly thereby disengaging it from the recess and freeing the stem for return to its normal position through the medium of the spring 64.

In Figs. 23 to 37 I have shown a different form of the invention which is somewhat simpler than that illustrated in Figs. 1 to 22. In this simpler form of the invention, the outer knob is indicated at 113, the inner knob at 114 and the spindle at 115. The spindle 115 is square in cross section as usual in door knobs and the inner knob 114 is provided with an interior collar 100 through which the spindle 115 extends, said collar having a square opening to fit the square shape of the spindle. This collar is rigidly anchored to the outer knob by means of a projection 101 which is rigid with the collar and which fits a recess formed in the inner knob. By this means, the inner knob 114 is constantly coupled to the spindle so that turning movement of the inner knob will turn the spindle.

The outer knob 113 is mounted for turning movement on a knob-supporting member 116 which is anchored to the door 1 in the same manner as shown with reference to the knob-supporting member 16 of Figs. 1 to 22, that is, by means of attaching lugs 119 which are interlocked with an anchoring disk 120 that is secured to the door. The means for clutching the outer knob 113 to the spindle 115 comprise the two clutch members 137 and 138 which in some respects are similar to the clutch members 37, 38 shown in Figs. 1 to 10. The clutch member 137 is made integral with the spindle 115, said clutch member having in its outer side a diametrical slot 139. The outer clutch member 138 is located within a chamber 103 with which the knob-supporting member 116 is provided and is provided with a fin 140 adapted to enter said slot for clutching the two clutch elements together. Situated between the two clutch elements is a spring 102 which normally keeps the clutch elements separated or disengaged from each other. The outer clutch element 138 is provided with a stem 161 which extends axially through the spindle 115 and projects beyond the inner knob 114, the outer end of said stem being screw threaded and having a thumb piece or small knob 163 screw threaded thereto.

Situated within the chamber 103 of the knob-supporting member 116 is a cylindrical barrel element 104 which is provided with an opening in which is located a key plug 128 provided with the usual key slot 129. The plug 128 is normally locked to the barrel element 104 through the medium of the usual tumbler pins 130 and follower pins 131, the latter being backed by the usual springs 132. When a proper key is inserted into the key slot 129, the tumbler pins and follower pins will be lined up thereby unlocking the plug 128 from the barrel 104.

The barrel 104 is coupled to the outer clutch member 138, this being accomplished by means of two coupling pins 105 which project from the inner face of the barrel and extend through openings 169 in the outer clutch member 138. Said clutch member 138 is formed in its periphery with a notch 106 which normally receives a projection 107 extending inwardly from the wall of the knob-supporting member 116, and thereby the outer clutch member is normally locked to the stationary knob-supporting member 116.

When, however, the outer clutch member 138 is moved inwardly against the action of the spring 102 thereby to bring it into clutching or coupling engagement with the inner clutch member 137, said outer clutch member is carried out of engagement with the projection 107 and is thus unlocked from the knob-supporting member 116.

The outer knob 113 is secured to the barrel 104 by means of attaching screws 108 which extend through the portion 109 of the knob that overlies the end of the barrel and are screw threaded into said barrel.

The key plug 128 is constructed so that it can move inwardly when it has been unlocked from the barrel by the insertion of a key into the key slot. The inner end of the key plug 128 engages the outer clutch member 138 when the latter is in its normal position shown in Fig. 23. To open the door from the outside, a proper key 187 is inserted into the key slot 129 thereby to line up the tumbler and follower pins and to unlock the key plug 128 from the barrel 104. The unlocked key plug is then pushed inwardly thereby moving the outer clutch member 138 inwardly which results in coupling the outer clutch member 138 to the inner clutch member 137 and also in moving the outer clutch member inwardly out of engagement with the locking projection 107.

When the outer clutch member is in this position, then the turning of the outer knob 113 will result in turning the barrel 104 within the knob-supporting member and since the outer clutch member is coupled to the barrel by means of the coupling pins 105 and is also clutched to the inner clutch member 137, such turning of the outer knob will result in turning the spindle 115 thereby withdrawing the door latch.

The coupling pins 105 are of sufficient length so that the outer clutch member 138 remains coupled to the barrel even when it is pushed inwardly into clutching engagement with the inner clutch member 137.

The key plug 128 is provided on its inner end with an outwardly extending projection 110 which is normally received in a recess 111 with which the barrel 104 is provided. When, however, the key plug is unlocked and is pushed inwardly, the projection 110 is carried out of the recess 111 and if the key plug is then turned slightly to carry the projection 110 out of register with the recess 111, the engagement of said projection with the inner face of the barrel will retain the key plug in its inward position and will, therefore, retain the outer clutch member 138 in its clutching engagement with the inner clutch member.

When the key plug is turned back again by means of the key into a position to bring the projection 110 into register with the recess 111 and the key is then withdrawn, the spring 102 will function to disengage the clutch members 137, 138 by moving the clutch member 138 back into its initial position shown in Fig. 23 in which the pin 107 on the knob-supporting member 116 occupies the notch 106 in said clutch member and thereby locks it from turning movement. This disengaging movement of the clutch member 138 will also move the plug 128 backwardly to its initial position and the tumbler pins 130 and the follower pins 131 will then function to lock the key plug 128 to the barrel member thereby locking the knob from turning movement.

I have stated above that this embodiment of the invention is also provided with means by which the lock can be set from the inside knob so that the clutch members 137, 138 will be in clutching engagement and the outer knob will be free to be turned for opening the door without the use of a key.

The inner end of the spindle 115 has a sleeve 170 screw threaded thereon, said sleeve extending into a central opening with which the inner knob 114 is provided and being formed with a flange 171 which overlies the face of the inner knob 114. 172 indicates a collar which is mounted for turning movement on the hub portion 179 of the knob 163 and is located between the knob 163 and the flange 171 of the sleeve 170. This collar 172 is loosely mounted on said hub and is provided with two legs or projections 173 which are adapted to be received in recesses 174 with which the sleeve 170 is provided.

The construction is such that when the clutch members 137, 138 are disengaged, the collar 172 will be resting against the sleeve 170 and the projections 173 are occupying the recesses 174.

By pulling inwardly on the knob 163, the outer clutch member 138 will be moved inwardly into clutching engagement with the inner clutch member 137 and will also be moved out of locking engagement with the projection 107 on the knob-supporting member. After the stem 161 has been thus pulled inwardly, the collar 172 may be moved backwardly to withdraw the projections 173 from the recesses 174 and then by giving the collar a turning movement on the spindle, these projections 173 will be carried out of register with the recesses and will by their engagement with the sleeve 170 hold the outer clutch member in its clutching engagement with the inner clutch member and also hold said outer clutch member disconnected from the projection 107. The flange 171 of the sleeve 170 may be provided with depressions 176 to receive the ends of the projections 173 when the parts are in the position shown in Fig. 25 thereby preventing the collar 172 from being accidentally restored to a position in which the projections 173 register with the recesses 174. When the parts are in this position, the outer knob is free to be turned without the use of a key, and the turning of the outer knob will operate through the engaged clutch members 137, 138 to turn the spindle 115 and thus withdraw the door latch.

The lock can thereby be set from the inside of the door so that a person can turn the outer knob and open the door without the use of a key.

The outer clutch member 137 is shown as provided with a radial slot 175 which is normally in line with the key slot. The purpose of this is to make it impossible for an unauthorized person to insert a wire or other small implement into the key slot and push the outer clutch member backwardly into clutching engagement with the inner clutch member and at the same time uncoupling said outer clutch member from the knob-supporting member.

I claim:

1. A door lock comprising a knob-supporting member stationarily secured to the outside of the door and projecting outwardly therefrom, an outer knob mounted on said knob-supporting member for turning movement, a lock located within the knob-supporting member and comprising a rotary member connected to the outer knob for simultaneous rotation therewith and means to lock the rotary member to the knob-supporting member, a spindle extending through the door and provided with means to withdraw the door latch as the spindle is turned, an inner knob mounted on and connected to the spindle, a normally disengaged clutch device for coupling said rotary member and thereby the outer knob to the spindle, and key-actuated means to both unlock said rotary member, and thereby the outer knob, from the knob-supporting member and to render the clutch device operative to clutch the rotary member, and thereby the outer knob, to the spindle.

2. A door lock comprising a knob-supporting member stationarily secured to the outside of the door and projecting outwardly therefrom, an outer knob mounted on said knob-supporting member for turning movement, a key-actuated lock located within the knob-supporting member and comprising a rotary member connected to the outer knob for simultaneous turning movement therewith, and means normally locking said rotary member, and thereby the outer knob, to the knob-supporting member, a spindle extending through the door and provided with means to withdraw the door latch as said spindle is turned, an inner knob mounted on and connected to the spindle, a normally disengaged clutch device for coupling said rotary member, and thereby the outer knob, to the spindle, and means operable from the inside of the door to unlock the rotary member, and thereby the outer knob, from the knob-supporting member and also to render said clutch device operative, whereby the spindle may be turned from the outer knob without the use of a key.

3. A door lock comprising a knob-supporting member stationarily secured to the outside of the door and projecting outwardly therefrom, an outer knob having an axial chamber in which said knob-supporting member is received, said outer knob being mounted on said knob-supporting member for turning movement, means normally locking said knob to the knob-supporting member, said means including a cylinder lock located within the knob-supporting member and provided with a plug and connected to the outer knob for simultaneous turning movement therewith, and also provided with tumbler and follower pins normally locking the plug to the knob-supporting member, a bolt-actuating spindle extending through the door, an inner knob mounted on and connected to said spindle, a normally disengaged clutch device to couple the plug, and thereby the outer knob, to the spindle, and means operable from the inner knob to both line up the tumbler and follower pins to unlock said plug, and thereby the outer knob, from the knob-supporting member and also to render said clutch device operative.

4. A door lock comprising a knob-supporting member stationarily secured to the outside of the door and projecting outwardly therefrom, an outer knob mounted on said knob-supporting member for turning movement, means normally locking said outer knob to the knob-supporting member, said means including a cylinder lock located within the knob-supporting member and provided with a key plug having a key slot and connected to the outer knob for simultaneous turning movement therewith, and also provided with tumbler and follower pins normally locking the key plug to the knob-supporting member, which pins are lined up by the insertion of a key in the key slot, a bolt-actuating spindle extending through the door, a normally disengaged clutch device to couple the key plug, and thereby the outer knob, to the spindle, and means to render the clutch device operative by such insertion of the key into the key slot.

5. A door lock comprising a knob-supporting member secured to the outside of the door and projecting outwardly therefrom, an outer knob having an axial chamber in which said knob-supporting member is received, said outer knob being mounted on said knob-supporting member for turning movement thereabout, a cylinder lock located within the knob-supporting member and including a key plug connected to the outer knob for simultaneous turning movement therewith, said key plug having a key slot and cooperating tumbler and follower pins by which said key plug is normally locked to the knob-supporting member but which are lined up to unlock the knob from the knob-supporting member by the insertion of a key in the key slot, a bolt-actuating spindle extending through the door, a normally disengaged clutch device to couple the key plug, and thereby the outer knob, to the spindle, said clutch device being situated to be engaged and rendered operative by a key inserted into the key slot, whereby the insertion of the key into the key slot both unlocks the outer knob from the knob-supporting member and couples said outer knob to the spindle.

6. A door lock comprising a knob-supporting member stationarily secured to and extending from the outside of the door, an outer knob having an axial chamber in which said knob-supporting member is received, said outer knob being mounted on the knob-supporting member for turning movement thereabout, a cylinder lock located within the knob-supporting member, said cylinder lock including a key plug having a key slot and cooperating tumbler and follower pins by which the key plug is normally locked to the knob-supporting member and which may be lined up to unlock the key plug from the knob-supporting member by the insertion of a key in the key slot, means providing a connection between the outer knob and the key plug by which rotation of one is transmitted to the other, a bolt-actuating spindle extending through the door, two co-operating clutch members for coupling said plug, and thereby the outer knob, to the spindle and a spring normally holding said clutch members disengaged, one of said clutch members being situated to be engaged and moved into clutching engagement with the other clutch member by a key inserted into the key slot, whereby the insertion of the key both unlocks the key plug, and thereby the outer knob, from the knob-supporting member and operatively engages the clutch members.

7. A door lock comprising a knob-supporting member secured to the outside of the door, an outer knob mounted thereon for turning movement, a spindle extending through the door, an inner knob mounted on and connected to said spindle, means normally locking the outer knob to the knob-supporting member, a clutch comprising two co-operating clutch members to couple the outer knob to the spindle, means normally holding the clutch disengaged, key controlled means operable from the outer knob to unlock said outer knob and bring the clutch members into engagement, and means operable from the inner knob to render the key-controlled means inoperative to bring the clutch members into clutching engagement.

8. A door lock comprising a knob-supporting member secured to the outside of the door, an outer knob mounted on said knob-supporting member for turning movement, a spindle extending through the door, an inner knob mounted on and connected to the spindle, means normally locking the outer knob to the knob-supporting member, a clutch device having inner and outer clutch members for coupling the outer knob to the spindle, means normally holding the clutch members disengaged, key-controlled means operable from the outer knob for unlocking the latter and for moving the outer clutch member into clutching engagement with the inner clutch member thereby to couple the unlocked outer knob to the spindle, and means operable from the inner knob to render the clutch device incapable of being engaged through the operation of the key-controlled means.

9. A door lock comprising a knob-supporting member secured to the outside of the door, and outer knob mounted on said knob-supporting member for turning movement, a spindle extending through the door, an inner knob mounted on and connected to the spindle, means normally locking the outer knob to the knob-supporting member, a clutch device having inner and outer clutch members for coupling the outer knob to the spindle, means normally holding the clutch members disengaged, key-controlled means operable from the outer knob for unlocking the latter and for moving the outer clutch member into clutching engagement with the inner clutch member thereby to couple the unlocked outer knob to the spindle, and means operable from the inner knob to move the inner clutch member into an inoperative position in which it cannot be engaged by the outer clutch member except when the key-controlled means is actuated by a special key.

10. A door lock comprising a knob-supporting member stationarily secured to the outside of the door and projecting outwardly therefrom, an outer knob having an axial chamber in which said knob-supporting member is received, said outer knob being mounted on said knob-supporting member for turning movement thereabout, a lock located within the knob-supporting member and including a key plug having a key slot and connected to the outer knob for simultaneous turning movement therewith, cooperating tumbler and follower pins normally locking the key plug, and thereby the outer knob, to the knob-supporting member, which pins are lined up to unlock the key plug, and thereby the outer knob, from the knob-supporting member by the insertion of a key in the key slot, a bolt-actuating spindle extending through the door, an inner knob mounted on the spindle, a normally disengaged clutch device to couple the key plug, and thereby the outer knob, to the spindle, and means operable by the insertion of a key in the key slot to render the clutch device operative when the outer knob is unlocked.

11. A door lock comprising a knob-supporting member stationarily secured to and extending from the outside of the door, an outer knob having an axial chamber in which said knob-supporting member is received, said outer knob being mounted on the knob-supporting member for turning movement thereabout, a lock located within the knob-supporting member, said lock including a rotatable plug connected to the outer knob for simultaneous turning movement therewith, co-operating tumbler and follower pins normally locking said plug to the knob-supporting member, a bolt-actuating spindle extending through the door, two cooperating clutch members for coupling said plug, and thereby the outer knob, to the spindle, a spring normally holding said clutch members disengaged, and means operable from the inner knob to line up the tumbler and follower pins thereby unlocking the plug and the outer knob from the knob-supporting member, and also to move the clutch members relatively into operative clutching engagement.

JOSEPH H. MILLIGAN.

REFERENCES CITED

The following references are of record in the file of this patent:

UNITED STATES PATENTS

| Number | Name | Date |
| --- | --- | --- |
| 509,194 | Carty | Nov. 21, 1893 |
| 823,221 | Jorgenson | June 12, 1906 |
| 866,583 | Hope | Sept. 17, 1907 |
| 1,755,434 | Ellingson | Apr. 22, 1930 |
| 1,810,909 | Ellingson | June 23, 1931 |
| 1,902,343 | Shaw | Mar. 21, 1933 |